Feb. 3, 1942.    R. C. BERRY ET AL    2,272,031
ELECTRIC WELDING APPARATUS
Filed July 10, 1941    3 Sheets-Sheet 1

INVENTORS
RALPH C. BERRY
& PERCY R. CARLTON
BY
Richey & Watts
ATTORNEYS

Feb. 3, 1942.    R. C. BERRY ET AL    2,272,031
ELECTRIC WELDING APPARATUS
Filed July 10, 1941    3 Sheets-Sheet 2
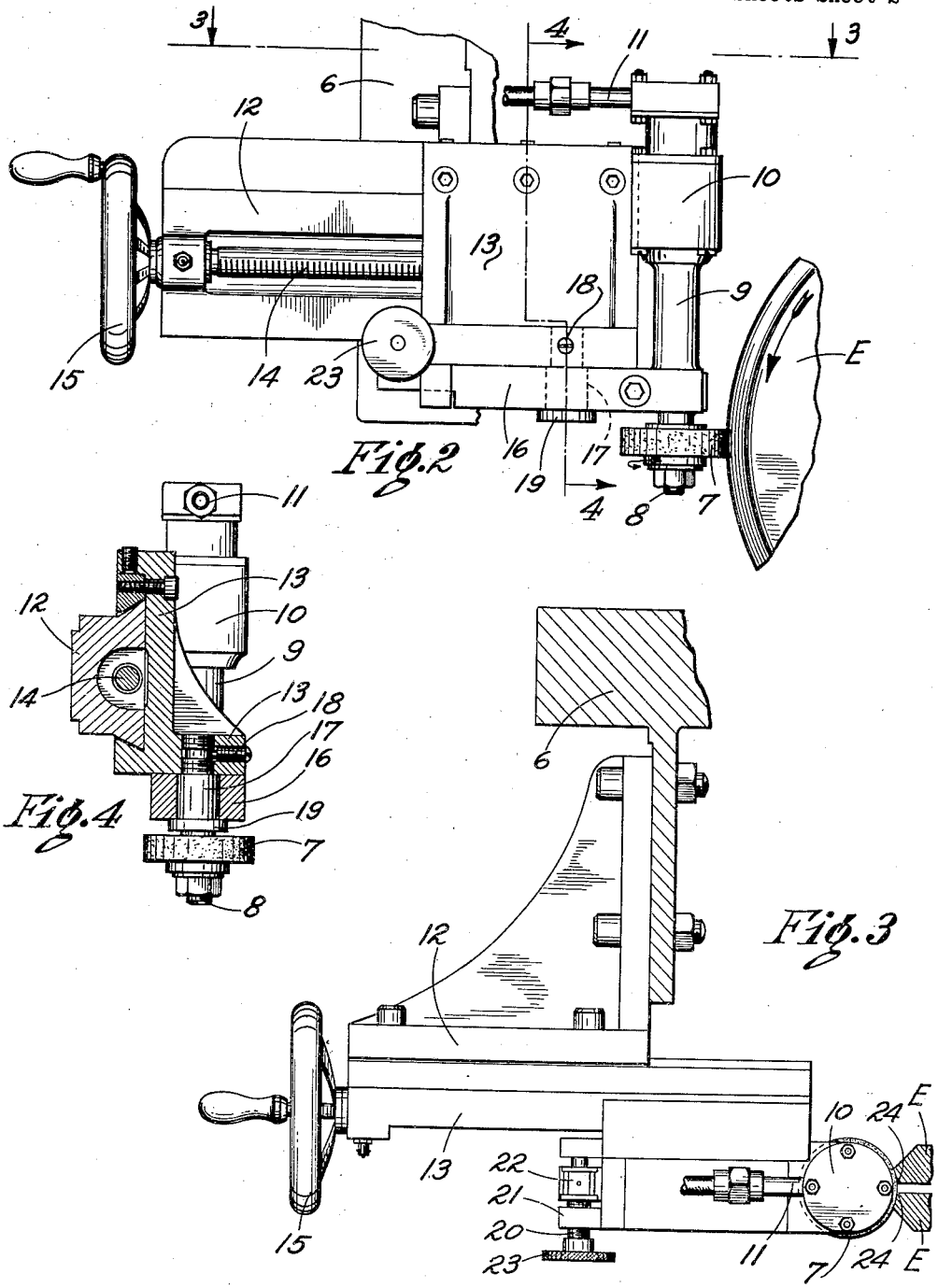
INVENTORS
RALPH C. BERRY
& PERCY R. CARLTON
BY Richey & Watts.
ATTORNEYS Feb. 3, 1942.    R. C. BERRY ET AL    2,272,031
ELECTRIC WELDING APPARATUS
Filed July 10, 1941    3 Sheets-Sheet 3
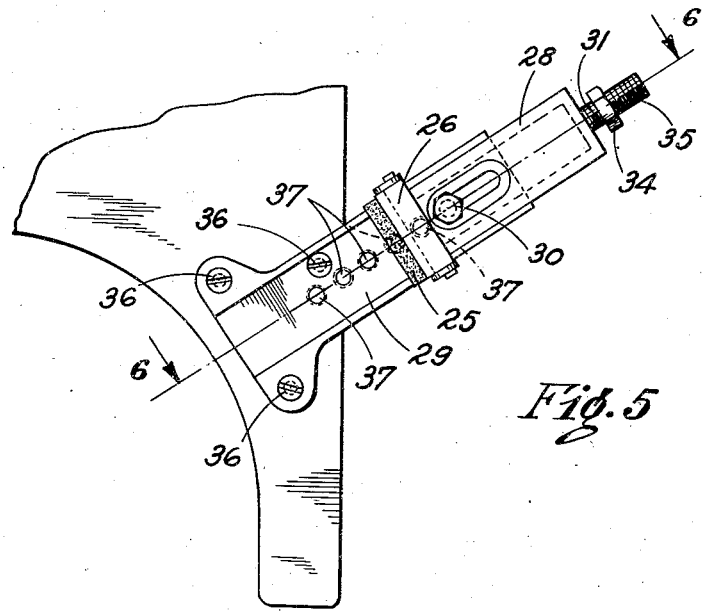
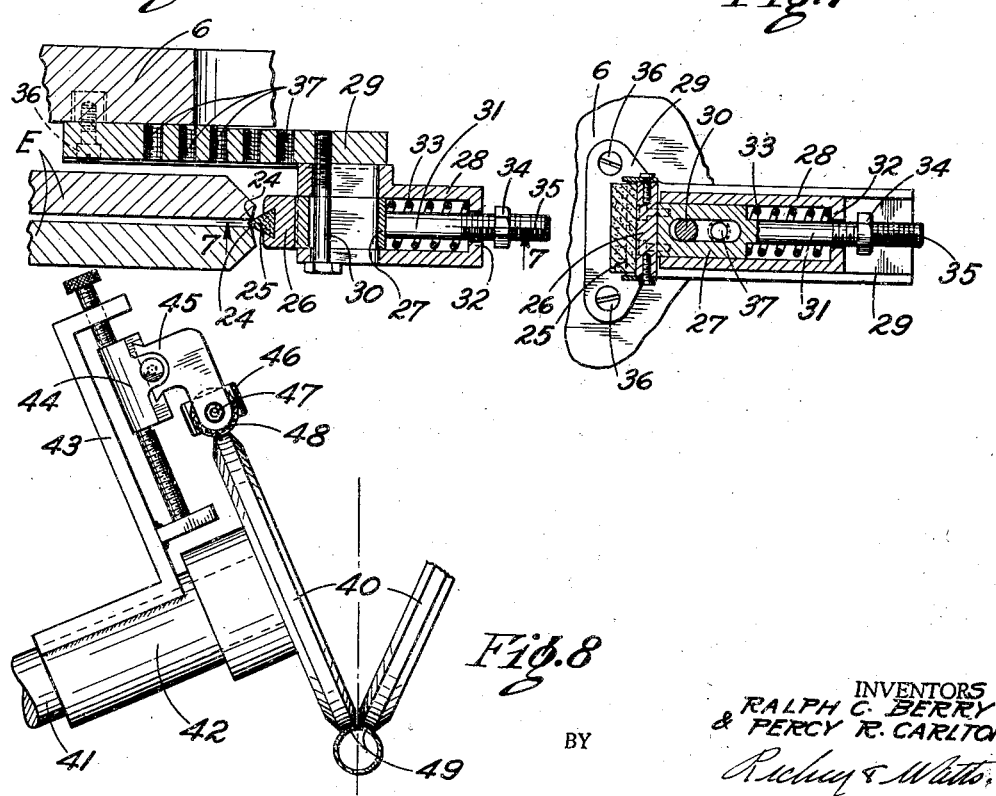
INVENTORS
RALPH C. BERRY
& PERCY R. CARLTON
BY
ATTORNEYS Patented Feb. 3, 1942

2,272,031

UNITED STATES PATENT OFFICE 2,272,031

ELECTRIC WELDING APPARATUS

Ralph C. Berry, Berkley, Mich., and Percy R. Carlton, Cleveland, Ohio, assignors to Republic Steel Corporation, Cleveland, Ohio, a corporation of New Jersey Application July 10, 1941, Serial No. 401,747

11 Claims. (Cl. 219—6)

This invention relates to electrode dressing apparatus for electric welding machines.

Steel tubing is commonly made by means of electric resistance butt welding machines in which two rotary electrodes are so disposed as to engage the moving tube on opposite sides of the seam gap. There are two types of such machines, one type having the electrodes substantially parallel to each other and mounted on a single shaft, and the other type having the electrodes disposed angularly with respect to each other or in V-shaped position and each mounted on its own shaft.

The electrodes of both of these types of machines have peripheral grooves or surfaces which are curved in cross-section so that they will engage the outer surface of the tube in a predetermined manner and to a predetermined extent with the resultant formation of a satisfactory welded seam. It is quite important that these peripheral grooves be properly contoured initially and that such contour be maintained substantially unchanged at all times. The electrodes become pitted and roughened in use and do not make satisfactorily welded tubing when in such a condition. Accordingly, various devices have been proposed heretofore to maintain a predetermined contour of the peripheral surfaces of the electrodes, but none of the proposed devices have been entirely satisfactory, so far as we are aware.

For welding machines of the parallel electrode type, cutting tools have been provided but care had to be taken to prevent current from flowing from one electrode to the other through the cutting tool if the tool was used while the current was on, or the current had to be turned off when the surfaces were being dressed by the tools. Ordinarily, the electrodes are not driven except by the moving tube and, consequently, if the electrodes were dressed when the current was off, tubes had to be run through the welding machine to turn the electrodes and such tubing was not welded.

In the other type of welding machine wherein the electrodes were positioned in what might be termed a V-shaped arrangement, the above stated difficulty of trimming while the current was on did not exist and the electrodes could be separately dressed while the welding machine was in operation, but one of their chief shortcomings was that it is quite difficult to maintain the original contour of the tube engaging peripheral surfaces of the two electrodes when each was dressed by a different tool.

The present invention provides means by which the contour of the peripheral grooves of electrodes of either the parallel or V-type machines may be maintained accurately, and the electrodes of the parallel types may be dressed when the current is on. Briefly described, this invention provides an electrode dresser, preferably an abrasive grinding wheel, which is practically a nonconductor of electricity and which is mounted to rotate on a shaft at right angles to the rotational axis of the electrode or electrodes with which the wheel contacts and with the face of the wheel being disposed at right angles to a radius of the electrode or electrodes with which it contacts.

One embodiment of the present invention is shown in the accompanying drawings in which—

Figure 2 is that enlarged fragmentary side elevation of our adjustable electrode dressing unit.

Figure 3 is a plan view taken substantially on the line 3—3 of Figure 2.

Figure 4 is a vertical cross-sectional view taken on line 4—4 of Figure 2.

Figure 5 is an enlarged fragmentary side elevation of our improved inner edge chamfering tool.

Figure 6 is a cross-sectional view taken on line 6—6 of Fig. 5.

Figure 7 is a cross-sectional view taken on line 7—7 of Figure 6; and

Figure 8 is a fragmentary diagrammatic view showing a V-type electrode tube welding machine embodying the present invention.

Figure 1:
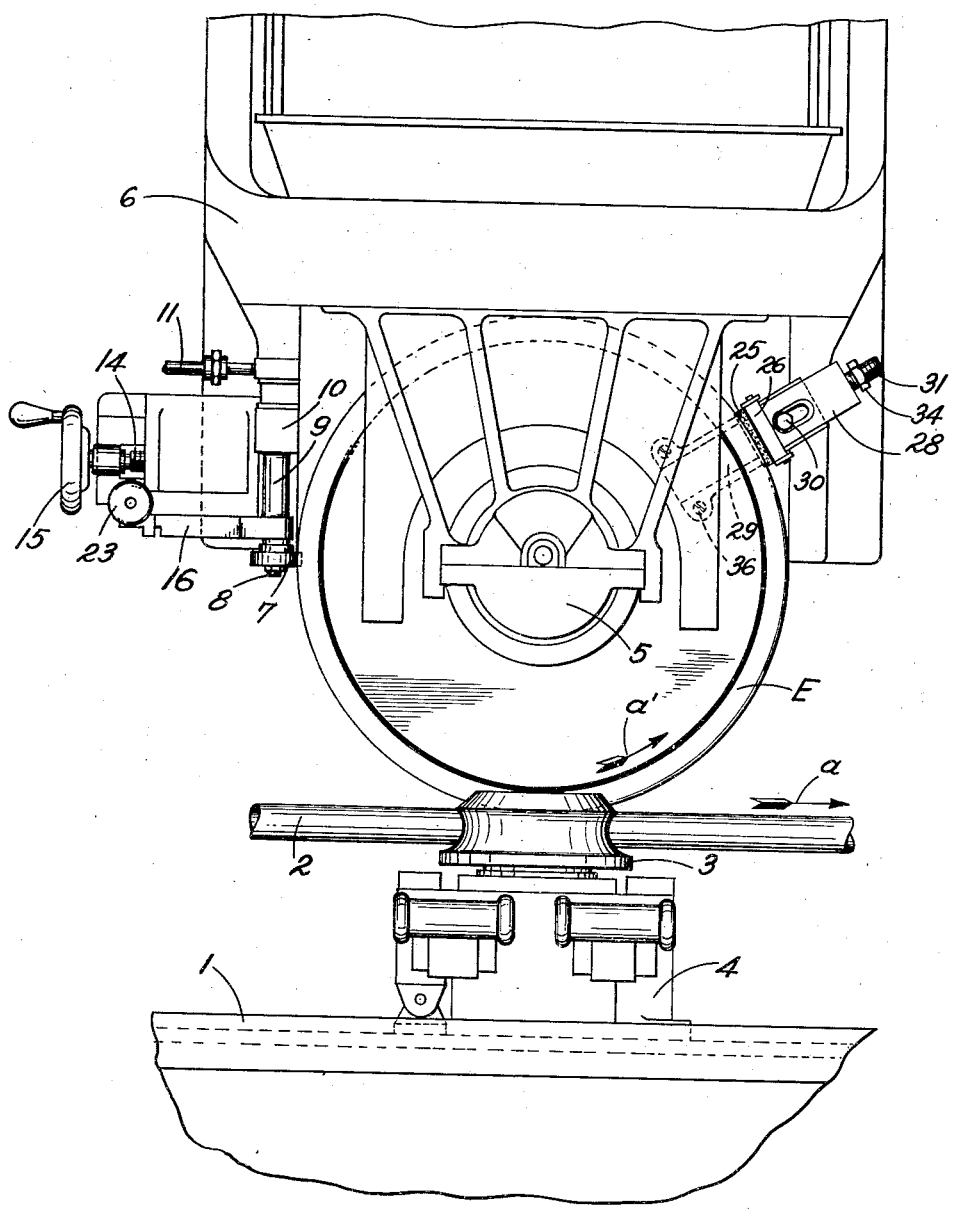
Figure 1 is a fragmentary side elevation of a parallel electrode type welding machine equipped with our improved electrode dressing apparatus.

In Figure 1 the base of the welding machine is indicated at 1. The tube 2, which is being welded, is guided by rolls 3 mounted on supporting frame 4. The direction of travel of the tube is indicated by the arrow a and as the pair of rotatable electrodes E rest upon the tube 2 they are rotated by movement of the tube as indicated by arrow a. The electrodes E are mounted on a suitable shaft supported in bearings 5 which in turn are carried by the housing 6 which is preferably vertically adjustable to permit variation of the pressure of the electrodes E upon the tube 2. As is best seen in Figure 3, the electrodes E are spaced apart and have their outer edges formed on a radius which will conform to and properly fit the outer surface of the tube being welded. In order to maintain this radius and in order to keep the contacting surfaces of the electrodes smooth and in good condition for welding, we provide a grinding wheel 7, mounted on a vertical shaft 8 which is supported in a housing 9 and driven by an air-motor 10 carried at the top of the housing 9. A pipe 11 leads to a source of air under pressure which may be controlled by a suitable valve (not shown). Although an air-motor is illustrated, it will be understood that the abrasive wheel 7 may be driven by any suitable means.

The diameter of the grinding wheel 7 is such that the groove in the electrodes is maintained at the proper radius to engage the tube being welded. As the electrodes rotate in a plane at right angles to the plane of rotation of the grinding wheel, the cross-sectional form of the groove in the electrodes is kept on a circular arc which is absolutely uniform throughout the full periphery of the electrodes.

In order to permit the wheel 7 to be fed toward the electrode and to be withdrawn from working position, we provide a bracket 12 supported on the housing 6. A secondary movable bracket 13 is mounted for sliding movement on the bracket 12 and has threaded engagement with the feed screw 14 which is rotatably mounted in the bracket 12. A hand wheel 15 is provided so that the screw 14 may be rotated to feed the bracket 13 toward or away from the electrodes. This provides an accurate and sensitive adjustment which permits the grinding wheel 7 to be set up against the electrode whenever it is desired to dress the groove therein. In order to provide a certain degree of lateral adjustment of the wheel 7 relative to the electrodes E, the shaft housing 9 is carried on an arm 16 which is pivotally supported on a pin 17 which is screwed into the bottom of bracket 13 and retained therein by a set screw 18 (see Figure 4). A head 19 on the bottom of pin 17 supports the arm 16 while permitting adjustment thereof. As is best seen in Figure 3, an adjusting screw 20 has threaded engagement in a lug 21 on the bracket 13 and is connected to the end 22 of the arm 16 so that rotation of the knurled head 23 of the screw 20 will move the arm 16 about its pivotal support 17 and swing the grinding wheel 7 toward one side or the other of the electrodes E. This adjustment permits accurate alignment of the grinding wheel 7 with the electrodes so that each electrode E will have the same groove contour.

When it is desired to re-surface or dress the electrodes E air is supplied to the motor 10 driving the grinding wheel 7 at high speed. While the electrodes E are being rotated the wheel 7 is fed forward by means of the hand wheel 15 and feed screw 14 to engage the electrode groove. The wheel is fed toward the center of the electrodes until enough of the surface of the electrodes has been removed to provide the proper contoured finish. The grinding wheel 7 may then either be withdrawn or left in position ready for again advancing the wheel against the electrode when re-surfacing is again needed.

The transverse grinding of the electrodes which is accomplished by the wheel 7, which has a radius equal to the radius which is to be imparted to the electrode groove, leaves a sharp edge in the inner surface of each electrode E as indicated at 24 in Figure 3. This sharp edge is in some instances undesirable as it may result in arcing or pitting during welding. In order to overcome this difficulty we provide an automatic chamfering tool for these edges 24. This tool is shown in Figures 5, 6 and 7 and comprises a triangular abrasive stone 25 of silicon carbide or the like. This stone is mounted in a holder 26 which is secured to a plunger member 27 slidably supported in a housing 28 which in turn is attached to a bracket 29 by a screw 30. A rod 31 extends from the plunger 27 through the end 32 of the housing 28 and a compression spring 33 is disposed between plunger 27 and the end 32 of housing 28. This spring 33 tends to move the plunger 27 toward the electrodes E (Figure 6) causing the opposite sides of the triangular abrasive member 25 to engage the opposite corners 24 of the electrodes. A nut 34 is disposed on the threaded outer end 35 of the rod 31 and, when the grinder 25 is engaging the electrodes, the nut 34 is backed off as shown in Figures 5, 6 and 7. If it is desired to move the stone 25 out of contact with the electrodes the nut 34 may be tightened down against the end 32 of housing 28 compressing the spring 33 and withdrawing the plunger 27 and stone 25.

The bracket 29 is mounted on the housing 6 by screws 36 and is provided with a plurality of threaded holes 37 for the screw 30. This arrangement permits the housing 28 to be secured to the bracket 29 in different positions so that a substantial range of electrode diameters may be accommodated.

With our improved electrode grinder an accurate radius is insured on the electrode grooves and, by employing a grinding wheel of an insulating material such as silicon carbide or other suitable abrasive, the electrodes may be dressed during the welding operation and while current is applied to the electrodes. By having the axis of the grinding wheel 7 disposed at right angles to the axis of the electrodes, it is unnecessary to provide a specially contoured grinding wheel. Our apparatus may easily be changed for different sizes of tubing by merely changing the diameter of the grinding wheel 7 so that it will correspond to the diameter of the tube being welded. Our chamfering tool cooperates with the grinding wheel to effect a simultaneous complete re-dressing of the electrodes during the welding operation. Both the chamfering and contouring units are readily adjusted for various electrode diameters.

In Figure 8 is shown one of the two electrodes 40 of a V-type tube welding machine. Its shaft 41 is supported within a housing 42. A bracket 43 affixed to housing 42 carries an arm 44 which is adjustable lengthwise of the bracket. This arm carries a holder 45 in which is mounted an air motor or other similar rotary power device 46 having a shaft 47 carrying a rotary grinding wheel 48. The holder 45 is adjustable on the bracket arm 44 so that the air motor 46 may be moved relative thereto. By adjusting the holder 44 and the motive power device 46 the face of the grinding wheel 48 may be disposed at right angles to the contoured groove 49 of the electrode 40 and may be located at right angles to a radius of the electrode and rotated about an axis perpendicular to the axis of rotation of the electrode. When the wheel is so located and is rotated it will dress the groove on the electrode on a circular arc which is uniform through the full periphery of the electrode.

It will be understood that when an electrode dresser embodying the present invention is mounted with its axis of rotation on the center of transverse curvature of the tube-engaging surface of an electrode and perpendicular to the center of rotation or axis of the electrode, the electrode dressing part of the dresser will be movable along a circular path whose center is the center of the transverse curvature of the tube-engaging surface of the electrode. Under such conditions the dresser will contact with the electrode surface at the end of and approximately at right angles to a radius of the electrode. By reason of this positioning and engagement of parts the original transverse curvature of the tube-engaging surface of each electrode may be maintained whether the electrodes are mounted parallel on one shaft and the dressing is done by a single dresser or the electrodes are mounted in V-shaped position on different shafts and each electrode is dressed by its own dresser.

Although we have described the illustrated embodiments of our invention in considerable detail, it will be understood by those skilled in the art that numerous variations and modifications may be made in the form and arrangement of our invention without departing from the spirit thereof. We do not, therefore, wish to be limited to the exact construction herein shown and described, but claim as our invention all embodiments thereof coming within the scope of the appended claims.

What is claimed is:

1. In electric resistance tube welding apparatus including a rotatable electrode having a transversely curved, tube-engaging peripheral surface and a supporting shaft therefor, the combination of a rotatable dresser wheel having an axis of rotation and a cylindrical surface to engage with and dress said curved electrode surface, means for positioning said dresser wheel with its axis of rotation on the center of transverse curvature of said electrode surface and perpendicular to the axis of the electrode shaft, and means for rotating said dresser with its cylindrical surface engaging said curved electrode surface throughout substantially the full transverse length of the latter.

2. In electric resistance tube welding apparatus including a rotatable electrode having a transversely curved, tube engaging peripheral surface, the combination of an electrode dressing wheel supported adjacent to the periphery of said electrode with its axis of rotation substantially perpendicular to the axis of rotation of said electrode, means for rotating said wheel, and means for moving said wheel into and out of engagement with the said curved periphery of said electrode, the radius of said wheel being substantially equal to the radius of the desired cross-sectional contour of the tube engaging surface of said electrode.

3. In electric resistance tube welding apparatus including a rotatable electrode having a transversely curved, tube engaging peripheral surface, the combination of an abrasive wheel supported adjacent to the periphery of said electrode with its electrode engaging surface disposed at substantially right angles to a radius of said electrode and with its axis of rotation substantially perpendicular to the axis of rotation of said electrode, means for driving said wheel, and means for moving said wheel into and out of engagement with the curved periphery of said electrode, the radius of said wheel being substantially equal to the radius of the desired cross-sectional contour of the tube engaging groove of said electrode.

4. In electric resistance tube welding apparatus including a pair of electrodes rotatable about the same axis and having transversely curved, tube engaging peripheral surfaces, the combination of an electrically nonconductive electrode dresser wheel supported for rotation about an axis perpendicular to the axis of said electrodes and adapted simultaneously to engage the tube engaging surfaces of both of said electrodes throughout substantially the full transverse extent of said surfaces, and means for rotating said wheel.

5. In electric resistance tube welding apparatus including a pair of parallel, spaced apart electrodes each having a transversely curved, peripheral tube engaging surface and shaft means rotatably supporting said electrodes, the combination of a substantially noncondutive, abrasive wheel, means for supporting said wheel for rotation about an axis substantially perpendicular to said shaft means, means for moving said wheel into and out of engagement with the peripheral surfaces of said electrodes, and means for rotating said wheel, the radius of said wheel being substantially equal to the radius of the desired contour of the tube engaging surfaces of said electrodes.

6. In electric resistance tube welding apparatus including a pair of parallel, spaced apart electrodes having transversely curved, peripheral tube engaging surfaces and shaft means rotatably supporting said electrodes, the combination of an abrasive wheel having a radius substantially equal to the radius of the desired cross-sectional contour of the said tube engaging surfaces, means for supporting said wheel for rotation about an axis substantially perpendicular to said shaft means, means for moving said wheel into and out of simultaneous engagement with said tube engaging surfaces throughout substantially their full transverse extent, means for positioning said wheel with its electrode engaging surface substantially perpendicular to a radius of said electrodes, and means for rotating said wheel.

7. In electric resistance tube welding apparatus including a pair of parallel, spaced apart electrodes having transversely curved peripheral tube engaging surfaces and shaft means rotatably supporting said electrodes, the combination of an abrasive wheel rotatable about an axis substantially perpendicular to the axis of said shaft means and having a face substantially perpendicular to a radius of said electrodes, said wheel face being simultaneously engageable with said curved peripheral surfaces and having a radius substantially equal to the desired radius of said surfaces, means for rotating said wheel, and a resiliently supported electrically nonconductive member positioned to enter the space between the opposed peripheral surfaces of the electrodes and chamfer the opposed edges of said surfaces.

8. An electrode dressing device for the rotatable electrodes of an electrical tube welder comprising, an abrasive wheel, means for supporting said wheel for rotation in a plane extending substantially at right angles to the plane of rotation of said electrodes, means for rotating said wheel, and means for moving the periphery of said wheel into peripheral engagement with said electrodes whereby the periphery of said electrodes will be dressed on a radius corresponding to the radius of said wheel.

9. In apparatus of the type described for dressing a pair of spaced parallel rotatable electrodes, an abrasive wheel simultaneously engageable with said electrode and rotatable in a plane transverse to the plane of rotation of the electrodes to be dressed, and a resiliently supported abrasive member adapted to enter the space between said electrodes and engage each electrode at the inner peripheral corner thereof.

10. In electric resistance tube welding apparatus including a pair of parallel, spaced apart electrodes having transversely curved peripheral tube engaging surfaces and shaft means rotatably supporting said electrodes, the combination of an electrically non-conductive abrasive wheel rotatable about an axis substantially perpendicular to the axis of said shaft means and having a face substantially perpendicular to a radius of said electrodes, said wheel being engageable with said peripheral surfaces and having a radius substantially equal to the desired radius of said surfaces, means for rotating said wheel, and an electrically non-conductive member positioned to enter the space between the opposed peripheral surfaces of the electrodes and engage the opposed edges of said surfaces.

11. In apparatus of the type described for dressing a pair of spaced parallel rotatable electrodes, an electrically non-conductive abrasive wheel simultaneously engageable with the periphery of said electrodes and rotatable in a plane transverse to the plane of rotation of the electrodes to be dressed, and an electrically non-conductive abrasive member adapted to enter the space between said electrodes and engage each electrode at the inner peripheral corner thereof.

RALPH C. BERRY.
PERCY R. CARLTON.